E. J. HARDY.
UNIVERSAL JOINT OF THE FLEXIBLE DISK TYPE.
APPLICATION FILED FEB. 3, 1920.
1,350,500.
Patented Aug. 24, 1920.
2 SHEETS—SHEET 1.
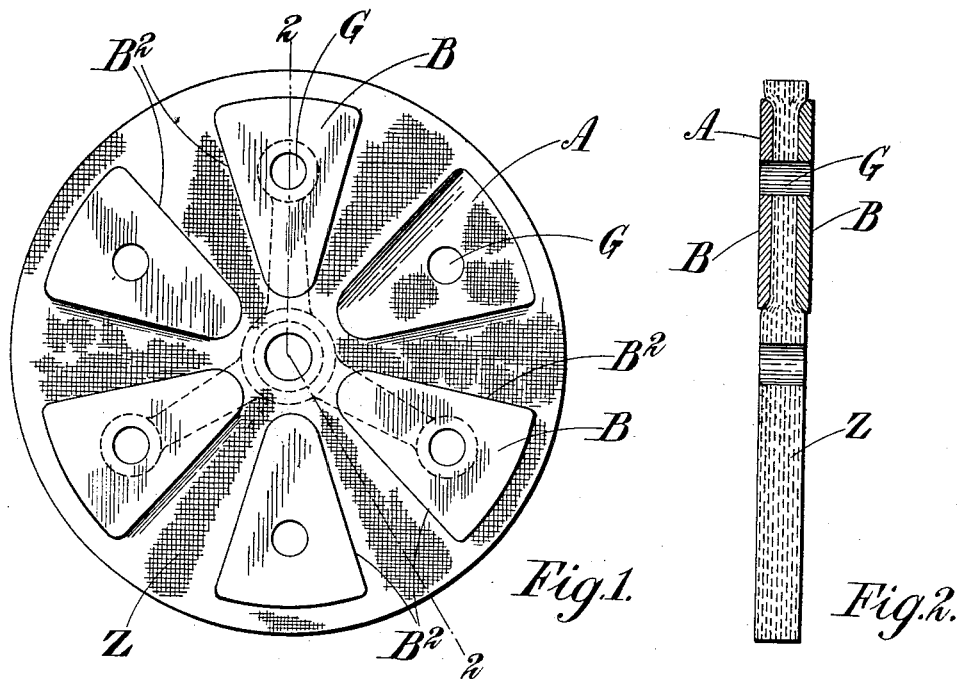
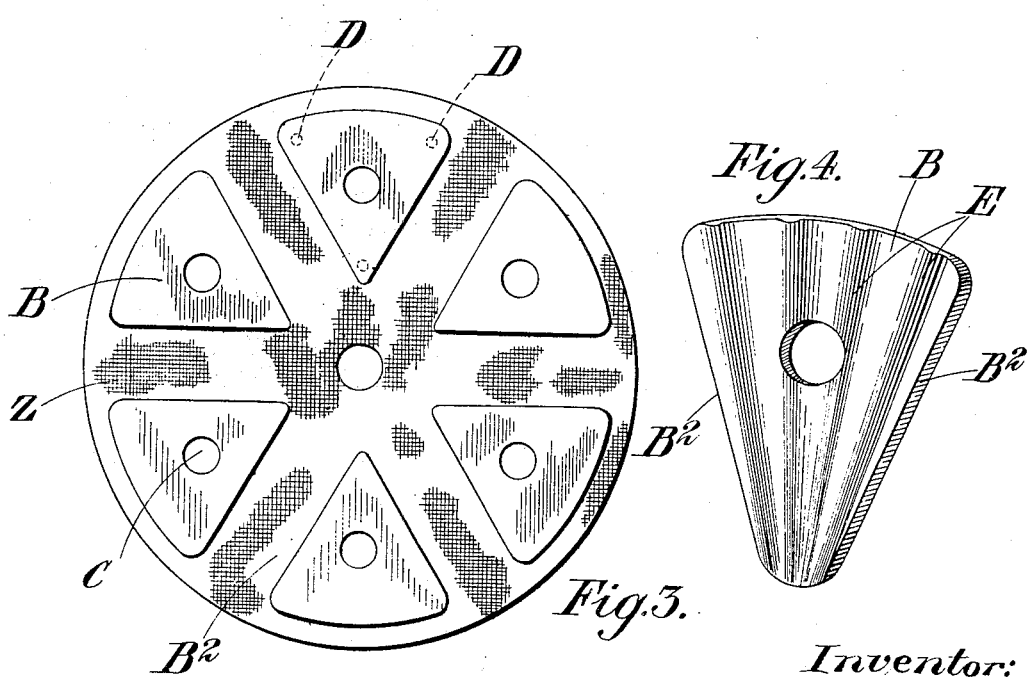
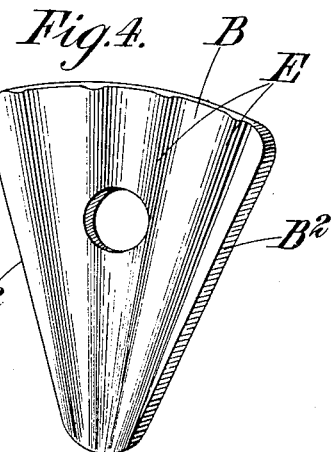
Inventor:
Edward John Hardy,
by Spear, Middleton, Donaldson & Hall
Attys.

E. J. HARDY.
UNIVERSAL JOINT OF THE FLEXIBLE DISK TYPE.
APPLICATION FILED FEB. 3, 1920.
1,350,500.
Patented Aug. 24, 1920.
2 SHEETS—SHEET 2.
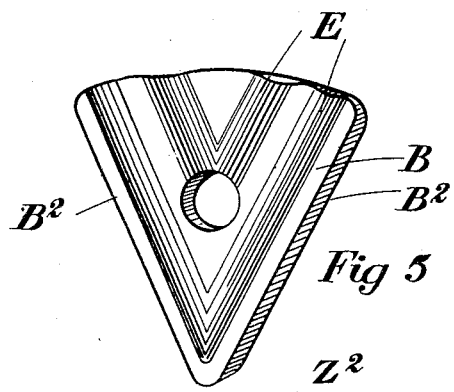
Fig 5.
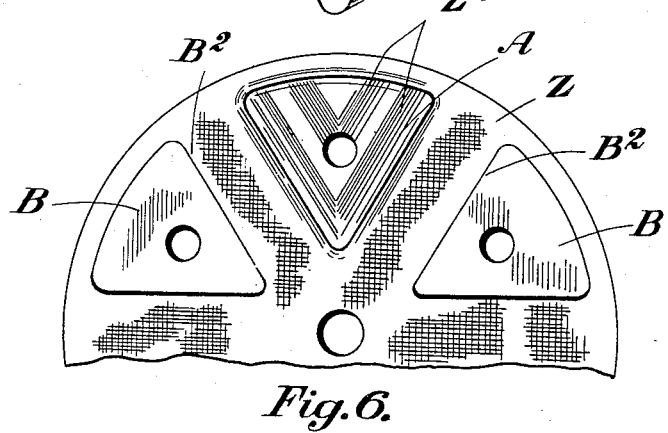
Fig. 6.
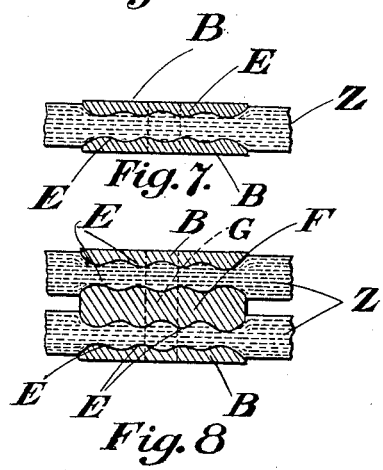
Fig. 7.
Fig. 8.
Inventor:
Edward John Hardy,
by Spear Middleton, Donaldson & Hall
Atty's.

UNITED STATES PATENT OFFICE.

EDWARD JOHN HARDY, OF COVENTRY, ENGLAND.

UNIVERSAL JOINT OF THE FLEXIBLE-DISK TYPE.

1,350,500.  Specification of Letters Patent.  Patented Aug. 24, 1920.

Application filed February 3, 1920. Serial No. 356,082.

*To all whom it may concern:*

Be it known that I, EDWARD JOHN HARDY, motor-accessory manufacturer, residing at Coventry, in the county of Warwick, England, have invented certain new and useful Improvements in Universal Joints of the Flexible-Disk Type, of which the following is a specification.

This invention relates to universal joints of the flexible rubber and fabric disk type in which each side of the disk is engaged by a plate, which may or may not be ribbed, in order to distribute the tangential stresses over a wide area. Such plates or washers have been circular or roughly triangular, in some cases with ribs or serrations concentric or parallel with the periphery of the plates.

The object of the invention is to provide means whereby the engagement of the plates with the disks is improved, so that there is little or no tendency for the tangential stress to pass directly from one bolt hole to the other, but is distributed without any doubt over a wide area and without excessive tightening of the bolts or damage to the threads.

According to this invention, in the face of the disk is molded, around each bolt hole, a recess, into which the plate fits snugly, so that its edges engage the edges of the recess. Where a ribbed plate is used, the recess is grooved or ribbed, to receive the ribs.

In the accompanying drawings,

Figure 1 is a face view of a disk with one form of improved plate, showing one plate removed.

Fig. 2 is a section on the line 2—2 of Fig. 1.

Fig. 3 is a face view of a disk showing an alternative form of plate.

Fig. 4 is a perspective view of a modified form of plate suitable for use in certain types of joint.

Fig. 5 is a similar view of another form of plate for use with another type of joint.

Fig. 6 is a view of part of a disk used with the plate shown in Fig. 5, with one plate removed.

Fig. 7 is a section through part of a disk showing a pair of plates in position, and Fig. 8 is a section showing the application of the invention to a joint embodying a pair of disks.

Like letters indicate like parts throughout the drawings.

In the case illustrated in Figs. 1 and 2, the faces of the disks Z are molded with approximately triangular recesses A into which fit the flat plates B of corresponding shape through which the usual bolts pass. Thus the edges $B^2$ of the plates transmit the tangential driving stress from plate to plate. If desired the plates on the two sides of the disk may be riveted together by rivets D shown in one of the plates in Fig. 3.

In some cases, in order to increase the engagement of the plates with the disks, it is preferable to corrugate or form ribs E on the side of the plates B next to the disk Z, as is shown in Figs. 4 to 8. When using ribbed plates of this kind, the recesses A, are provided with corresponding grooves $Z^2$ to receive the ribs E (see Fig. 6).

In one type of disk joint it is necessary for the edges $B^2$ to be radial, as is shown in Fig. 1. In such a case the ribs E, when used, would be radial, see Fig. 4. In another type of the disk joint, each adjacent pair of edges $B^2$ on adjacent plates, must be parallel to one another and to a radius passing midway between them, as shown in Fig. 3. In such cases the ribs E on each plate would be parallel to the edges $B^2$ thereof, see Figs. 5 and 6.

In joints employing more than one flexible disk Z, there would be one series of plates B on the outer face of each disk and another series of plates F between each disk, each plate being recessed into its corresponding disk face, as is shown in Fig. 8, and each plate having ribs E if desired.

The tangential stress due to the driving torque instead of being concentrated in a small part of the disk directly between the attachment points, i. e., the bolt holes G, is thus spread out over a large width of disk and a very strong construction is obtained.

When the disk is made of molded rubber fabric, the recesses for the plates and for the ribs E may be molded at the time that the disk is molded or subsequently.

What I claim as my invention and desire to secure by Letters Patent of the United States is:—

1. The combination of a flexible universal joint disk, plates upon the surface of said disk, bolt holes in said plates and said disk, recesses molded in the surface of said disk into which said plates fit, the edges of said plates engaging the edges of said recesses, substantially as set forth.

2. In a flexible disk joint as claimed in claim 1, the combination of ribbed plates and molded ribbed recesses in the disk, substantially as set forth.

In testimony whereof I have signed my name to this specification.

EDWARD JOHN HARDY.